United States Patent
Zhou et al.

(10) Patent No.: US 10,656,513 B2
(45) Date of Patent: May 19, 2020

(54) LIGHT-REFLECTING MICROSTRUCTURE, PROJECTION SCREEN AND PROJECTION SYSTEM

(71) Applicant: APPOTRONICS CORPORATION LIMITED, Shenzhen, Guangdong (CN)

(72) Inventors: Yuxuan Zhou, Shenzhen (CN); Fei Hu, Shenzhen (CN); Yi Li, Shenzhen (CN)

(73) Assignee: Appotronics Corporation Limited, Shenzhen, Guangdong (CN)

( * ) Notice: Subject to any disclaimer, the term of this patent is extended or adjusted under 35 U.S.C. 154(b) by 0 days.

(21) Appl. No.: 16/319,260

(22) PCT Filed: Apr. 28, 2017

(86) PCT No.: PCT/CN2017/082432
§ 371 (c)(1),
(2) Date: Jan. 18, 2019

(87) PCT Pub. No.: WO2018/014619
PCT Pub. Date: Jan. 25, 2018

(65) Prior Publication Data
US 2019/0227425 A1    Jul. 25, 2019

(30) Foreign Application Priority Data

Jul. 19, 2016    (CN) .......................... 2016 1 0575206

(51) Int. Cl.
G03B 21/60    (2014.01)
(52) U.S. Cl.
CPC ..................... *G03B 21/60* (2013.01)
(58) Field of Classification Search
CPC .................................................. G03B 21/602
(Continued)

(56) References Cited

U.S. PATENT DOCUMENTS

| 4,767,186 A | 8/1988 | Bradley, Jr. et al. |
| 4,991,933 A * | 2/1991 | Park ..................... G03B 21/602 359/455 |

(Continued)

FOREIGN PATENT DOCUMENTS

| CN | 204009335 U | 12/2014 |
| CN | 204009343 U | 12/2014 |

(Continued)

OTHER PUBLICATIONS

International Search Report of corresponding Patent Application No. PCT/CN2017/082432—2 pages (dated Jul. 19, 2017).

(Continued)

*Primary Examiner* — Christopher E Mahoney
(74) *Attorney, Agent, or Firm* — Knobbe, Martens, Olson & Bear, LLP (57) ABSTRACT

Provided are a light-reflecting microstructure, a projection screen and a projection system. The light-reflecting microstructure includes a transparent structure, the transparent structure including a light incident surface, a light-reflecting surface and a light-absorption surface connecting the light incident surface and the light-reflecting surface; a light-absorption structure located on the light-absorption surface; and a reflection layer located on the light-reflecting surface. The transparent structure is configured to refract projected light incident on the light incident surface at a preset angle to the reflection layer, and refract stray light incident on the light incident surface at another angle to the light-absorption structure. The reflection layer is configured to reflect the projected light in such a manner that the projected light is emitted at a certain angle from the light incident surface after being refracted twice through the transparent structure. The light-absorption structure is configured to absorb stray light.

17 Claims, 6 Drawing Sheets

(58) Field of Classification Search
USPC .................................. 359/459, 455
See application file for complete search history.

(56) References Cited

U.S. PATENT DOCUMENTS

| | | | |
|---|---|---|---|
| 7,835,078 B2* | 11/2010 | Ichikawa | G03B 21/60 |
| | | | 359/443 |
| 9,046,756 B1* | 6/2015 | Marason | G03B 21/602 |
| 2005/0057804 A1 | 3/2005 | Umeya et al. | |
| 2006/0164729 A1* | 7/2006 | Wood | G02B 3/005 |
| | | | 359/619 |
| 2007/0146876 A1* | 6/2007 | Peterson | G02B 13/06 |
| | | | 359/449 |
| 2009/0161074 A1 | 6/2009 | Shinozaki et al. | |
| 2010/0091365 A1* | 4/2010 | Shiau | G03B 21/56 |
| | | | 359/448 |
| 2010/0165459 A1 | 7/2010 | Lin et al. | |

FOREIGN PATENT DOCUMENTS

| | | | |
|---|---|---|---|
| CN | 105759555 A | | 7/2016 |
| CN | 205910490 U | | 1/2017 |
| JP | 7-36118 A | | 2/1995 |
| JP | 2015-69150 A | | 4/2015 |
| TW | 201015200 A1 | | 4/2010 |

OTHER PUBLICATIONS

Extended European Search Report in corresponding European Patent Application No. 17830257.6 dated Feb. 27, 2020, 7 pages.
Office Action in corresponding Japanese Patent Application No. 2019-503318 dated Feb. 5, 2020, 4 pages.

* cited by examiner

LIGHT-REFLECTING MICROSTRUCTURE, PROJECTION SCREEN AND PROJECTION SYSTEM

CROSS-REFERENCE TO RELATED APPLICATIONS

The present application is a national phase application of International Application No. PCT/CN2017/082432 filed on Apr. 28, 2017, which claims priority to Chinese Patent Application No. 201610575206.6, filed on Jul. 19, 2016, the contents of which are incorporated herein by reference in its entirety.

TECHNICAL FIELD

The present disclosure relates to the field of projection technology, and more particularly to a light-reflecting microstructure, a projection screen, and a projection system.

BACKGROUND

In the projection system, since the position of the viewer is relatively fixed, it is desired that the projected light of the image projected onto the screen by the projection system is only reflected to the viewer field, and not reflected to other invalid areas, so as to improve the efficiency of the projection system and then improve the brightness of the image on the screen viewed by the viewer. In addition, it is desired to reduce the reflected light, which is on the screen and observed by the viewer, reflected by the stray light instead of being reflected by the image of the projection system, thereby improving the contrast of the projection system.

In the related art, it has been proposed to increase the microstructure on the surface of the screen to meet the above two requirements. However, all of these microstructures use physical (such as shot peening) or chemical (such as corrosion) methods to form random microstructures on the surface of the screen, and although emergent light can have a certain emergent angle statistically by a certain control method, it is impossible for such microstructure to control the stray light not to be emitted to the viewer field, resulting in a lower contrast of the projection screen.

SUMMARY

In view of this, the present disclosure provides a light-reflecting microstructure, a projection screen, and a projection system, so as to solve the problem that the existing microstructure cannot control the stray light not to be emitted to the viewer field and therefore the contrast of the projection screen is low.

To achieve the above objects, the present disclosure provides the following technical solutions.

A light-reflecting microstructure includes:
a transparent structure, the transparent structure comprising a light incident surface, a light-reflecting surface, and a light-absorption surface connecting the light incident surface and the light-reflecting surface;
a light-absorption structure located on the light-absorption surface; and
a reflection layer located on the light-reflecting surface,
wherein the transparent structure is configured to refract projected light incident on the light incident surface at a preset angle to the reflection layer, and refract stray light incident on the light incident surface at another angle to the light-absorption structure, the reflection layer is configured to reflect the projected light in such a manner that the projected light is emitted at a certain angle from the light incident surface after being refracted twice by the transparent structure, and
the light-absorption structure is configured to absorb the stray light.

In an embodiment, the transparent structure comprises a first portion and a second portion located at a top of the first portion,
the first portion is a structure having a cross section being an inverted trapezoid, and the second portion is a structure having a bottom surface being a planar surface and a top surface being a curved surface; and the top surface of the second portion is the light incident surface of the transparent structure, a bottom surface of the first portion is the light-reflecting surface of the transparent structure, and a side surface of the first portion is the light-absorption surface of the transparent structure.

In an embodiment, the curved surface is a cylindrical, arced or spherical curved surface.

In an embodiment, an emergent angle of the projected light emitted from the light incident surface at a certain angle after being refracted by the transparent structure is determined by a focal length of the top surface of the second portion, a distance between a top surface of the first portion and the bottom surface of the first portion, and a side length of the top surface of the first portion.

In an embodiment,
when f≤2h and tan α≤d/2h−d/2f, $$\tan\gamma = \frac{\left(2h\tan\alpha + \frac{hd}{f} - \frac{d}{2}\right)(2f - 2h) - f^2\tan\alpha}{(2h-f)f};$$

when f≤2h and tan α≥d/2h−d/2f, $$\tan\gamma = \frac{(f-h)d - f^2\tan\alpha}{(2h-f)f};$$

when f≤2h, $$\tan\beta = \frac{\left(\frac{hd}{f} - 2h\tan\alpha - \frac{d}{2}\right)(2h-2f) + f^2\tan\alpha}{(2h-f)f};$$

when f>2h, $$\tan\gamma = \frac{f\tan\alpha}{f-2h} - \frac{3fhd + 4f^2\tan\alpha - df^2 - 2h^2d - 4fh^2\tan\alpha}{f^3(f-2h)};$$

and
when f>2h, $$\tan\beta = \frac{(f-h)(f\tan\alpha - 4hf - df + 2hd - 4hf\tan\alpha)}{f^2(f-2h)},$$

wherein α is an incident angle of the projected light entering into the transparent structure, β is a first maximum emergent angle of the projected light emitted from the transparent structure, γ is a second maximum emergent angle of the projected light emitted from the transparent structure, the first maximum emergent angle and the second maximum emergent angle are maximum emergent angles respectively located at two sides of a normal of the light-reflecting microstructure, d is the side length of the top surface of the first portion, h is the distance between the top surface of the first portion and the bottom surface of the first portion, and f is the focal length of the top surface of the second portion.

In an embodiment, a plane of the reflection layer is parallel to or angled with respect to a plane of the top surface of the first portion.

In an embodiment, the light-absorption structure is made of a color silicone rubber or a transparent material doped with carbon powder.

In an embodiment, the reflection layer is a metal layer.

A projection screen includes a surface having a plurality of light-reflecting microstructures. Each of the plurality of light-reflecting microstructures is the light-reflecting microstructure according to any one of the above aspects.

In an embodiment, the plurality of light-reflecting microstructures is arranged in a matrix arrangement on the surface of the projection screen.

A projection system includes a projection device and a projection screen disposed on a projection light path of the projection device. The projection screen is the projection screen according to any one of the above aspects.

In an embodiment, angles between planes of reflection layers of the plurality of light-reflecting microstructures located at different positions of the projection screen and a plane of the projection screen are different.

Compared with the related art, the technical aspects provided by the present disclosure have the following advantages.

With the light-reflecting microstructure, the projection screen and the projection system provided by the present disclosure, the light-reflecting microstructure provided includes a transparent structure, a light-absorption structure and a reflection layer. Since the reflection layer can reflect the projected light refracted by the transparent structure and cause the projected light to be emitted at a certain angle after being refracted twice by the transparent structure, the projection screen to which the light-reflecting microstructure is applied can allow the projected light of the image projected onto the screen to be reflected only to the viewer field, resulting in higher brightness of the projection screen and higher efficiency of the projection system. Since the light-absorption structure is capable of absorbing stray light refracted by the transparent structure, the problem that the existing light-reflecting microstructure cannot control the stray light can be solved, thereby improving the contrast of the projection screen.

BRIEF DESCRIPTION OF DRAWINGS

In order to more clearly illustrate the embodiments of the present disclosure or the technical aspects in the related art, the drawings used in the embodiments or the description of the related art will be briefly described below. Obviously, the drawings in the following description are only embodiments of the present disclosure, and those skilled in the art can obtain other drawings according to the provided drawings without any creative work.

DESCRIPTION OF EMBODIMENTS

The technical aspects in the embodiments of the present disclosure are clearly and completely described below with reference to the accompanying drawings in the embodiments of the present disclosure. It is obvious that the described embodiments are only part of the embodiments of the present disclosure, but not all embodiments. All other embodiments obtained by those skilled in the art based on the embodiments of the present disclosure without creative efforts will fall within the scope of the present disclosure.

An embodiment of the present disclosure provides a light-reflecting microstructure that is primarily applied to a projection screen. The light-reflecting microstructure is configured to control a range of an emergent angle of projected light projected onto a projection screen and absorb most of stray light projected onto the projection screen.

Figure 1:
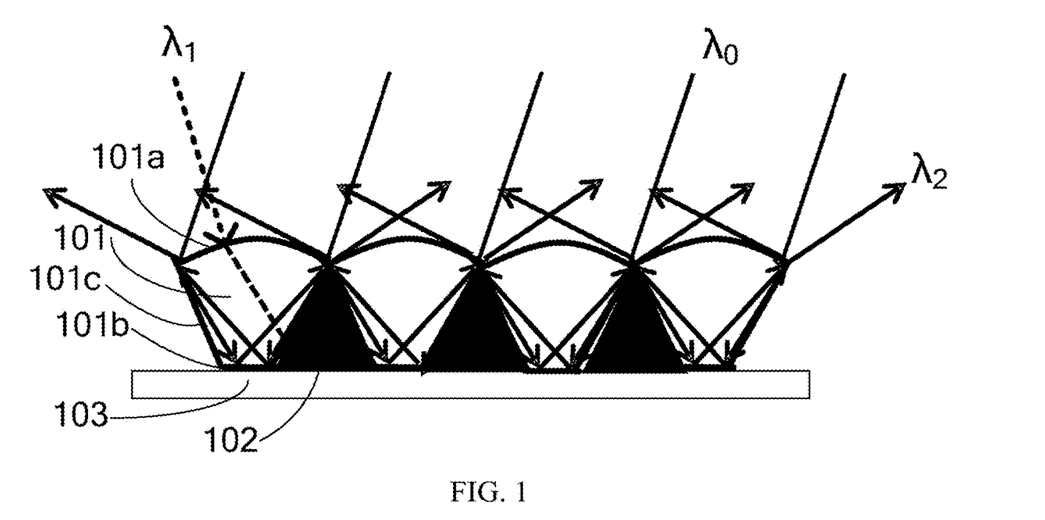
FIG. 1 is a cross-sectional structural schematic view of a light-reflecting microstructure according to an embodiment of the present disclosure.
Figure 2:
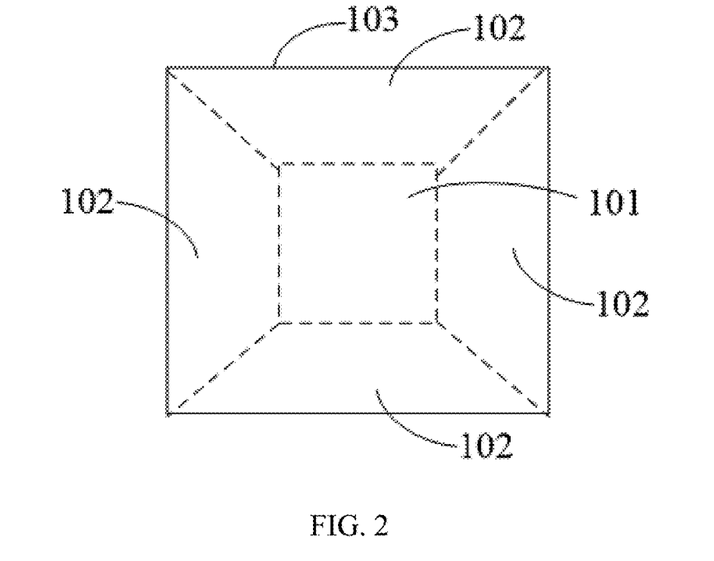
FIG. 2 is a top plan structural schematic view of a light-reflecting microstructure according to an embodiment of the present disclosure.

As shown in FIGS. 1 and 2, the light-reflecting microstructure includes a transparent structure 101, a light-absorption structure 102 and a reflection layer 103. The transparent structure 101 includes a light incident surface 101a, a light-reflecting surface 101b, and a light-absorption surface 101c connecting the light incident surface 101a and the light-reflecting surface 101b. The light-absorption structure 102 is located on the light-absorption surface 101c of the transparent structure 101, and the reflection layer 103 is located on the light-reflecting surface 101b of the transparent structure 101. Specifically, the reflection layer 103 is located not only on the light-reflecting surface 101b of the transparent structure 101 but also on the bottom surface of the light-absorption structure 102.

The transparent structure 101 is configured to refract the projected light $\lambda_0$ incident on the light incident surface 101a at a preset angle to the reflection layer 103 on the light-reflecting surface 101b thereof, and refract the stray light $\lambda_1$ incident at another angle to the light-absorption structure 102 on the light-absorption surface 101c thereof. The reflection layer 103 is configured to reflect the projected light $\lambda_0$ refracted thereon by the transparent structure 101 in such a manner that the projected light $\lambda_0$ is emitted from the light incident surface 101a at a certain angle after being refracted twice by the transparent structure 101. That is, the reflection layer 103 may reflect the projected light $\lambda_0$ to the light incident surface 101a of the transparent structure 101, and the projected light $\lambda_0$ is emitted at a certain angle after being refracted twice by the light incident surface 101a. For example, the emitted light is $\lambda_2$. The light-absorption structure 102 is configured to absorb the stray light $\lambda_1$ refracted thereto by the transparent structure 101.

Since the distance from the projection device to the projection screen is fixed, the projected light $\lambda_0$ projected by the projection device onto the projection screen is parallel light, which has a fixed incident angle, that is, the preset angle is fixed. Thus, the shape, size and the like of the transparent structure 101 can be reasonably designed based on this incident angle, in such a manner that the incident projected light $\lambda_0$ is totally refracted and converged on the reflection layer 103 located on the bottom surface, and then is emitted to the viewer field at a certain angle after being reflected by the reflection layer 103 and refracted twice by the transparent structure 101. The incident angle of the projected light $\lambda_0$ in the embodiment of the present disclosure refers to an angle between the incident ray and a normal perpendicular to a plane of the projection screen. In addition, since the position of the viewer field with respect to the projection screen is fixed, a range of an angle at which the projected light $\lambda_0$ is emitted to the viewer field is also fixed, and thus the shape, size and the like of the transparent structure 101 can be adjusted according to the range of the emergent angle in such a manner that the projected light $\lambda_0$ emitted from the light-reflecting microstructure is completely projected to the viewer field.

Figure 3:
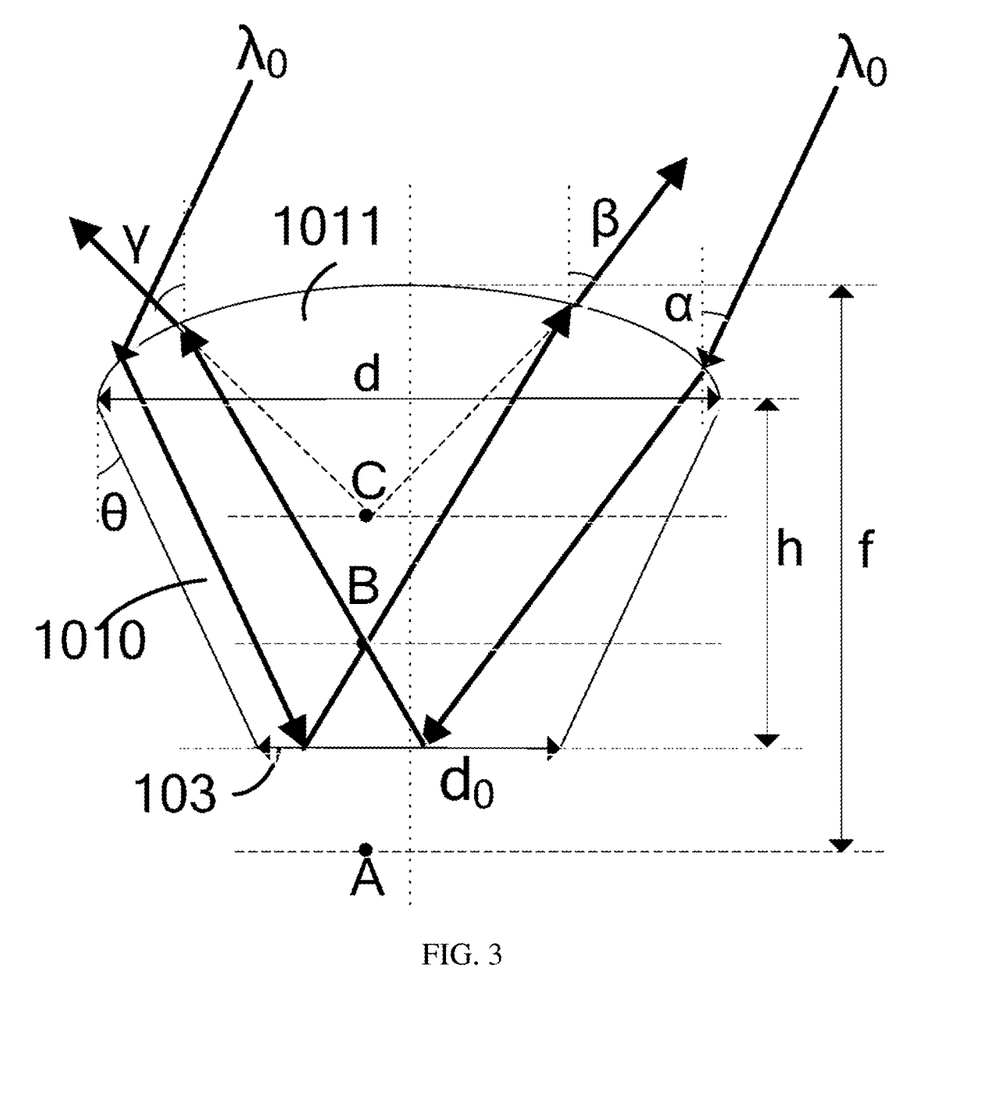
FIG. 3 is a schematic view of a transparent structure according to an embodiment of the present disclosure.

In the present embodiment, as shown in FIG. 3, the transparent structure 101 includes a first portion 1010 and a second portion 1011 located at the top of the first portion 1010. The first portion 1010 is a structure having a cross section being an inverted trapezoid, that is, the first portion 1010 is a structure having a cross section being a trapezoid. In addition, in its cross-sectional view, the side length d of the top surface of the first portion 1010 is greater than the side length do of the bottom surface of the first portion 1010. The top surface of the second portion 1011 is the light incident surface 101a of the transparent structure 101, the bottom surface of the first portion 1010 is the light-reflecting surface 101b of the transparent structure 101, and the side surface of the first portion 1010 is the light-absorption surface 101c of the transparent structure 101.

Optionally, the first portion 1010 includes a square bottom surface, a square top surface, and four side surfaces. The bottom surface and the top surface of the first portion 1010 are parallel, and vertical lines of their centers are a same straight line and inclination angles of the four side surfaces with respect to the vertical plane are all θ. The second portion 1011 has a structure having a bottom surface being a planar surface and a top surface being a curved surface. The curvature center of the curved surface is under the curved surface, that is, the curved surface protrudes away from the first portion 1010. Optionally, the second portion 1011 is a spherical structure formed by cutting a small portion of a sphere with a plane, that is, the top surface of the second portion 1011 may be a spherical curved surface. Of course, in other embodiments, the top surface of the second portion 1011 may also be a columnar or arced surface and the like. Since the top surface of the second portion 1011 is a curved surface, the incident projected light $\lambda_0$ can be well converged onto the reflection layer 103 by the transparent structure 101.

Assuming that the angle of the projected light $\lambda_0$ incident on the transparent structure 101 is $\alpha$, the first maximum emergent angle of the light emitted from the transparent structure 101 is $\beta$, the second maximum emergent angle is $\gamma$, the inclination angle of the side surface of the transparent structure 101 (i.e., the angle between the side surface and the vertical surface) $\theta$, the focal length of the curved surface of the second portion 1011 is f, and a virtual image A of the incident projected light $\lambda_0$ is focused on the focal plane after being focused by the curved surface, the projected light converges at point B after being reflected by the reflection layer 103, while the ray that converges at point B is emitted outwardly via the curved surface of the second portion 1011 and an inverse extension line of the emitted ray converges at a virtual image C. In this case, the first maximum emergent angle $\beta$ and the second maximum emergent angle $\gamma$ are maximum emergent angles respectively located on two sides of the normal of the reflective micro-structure (i.e., a normal of the plane of the projection screen). That is, the emergent ray corresponding to the first maximum emergent angle $\beta$ and the emergent ray corresponding to the second maximum emergent angle $\gamma$ are respectively located on two sides of the normal of plane of the projection screen.

Figure 4:
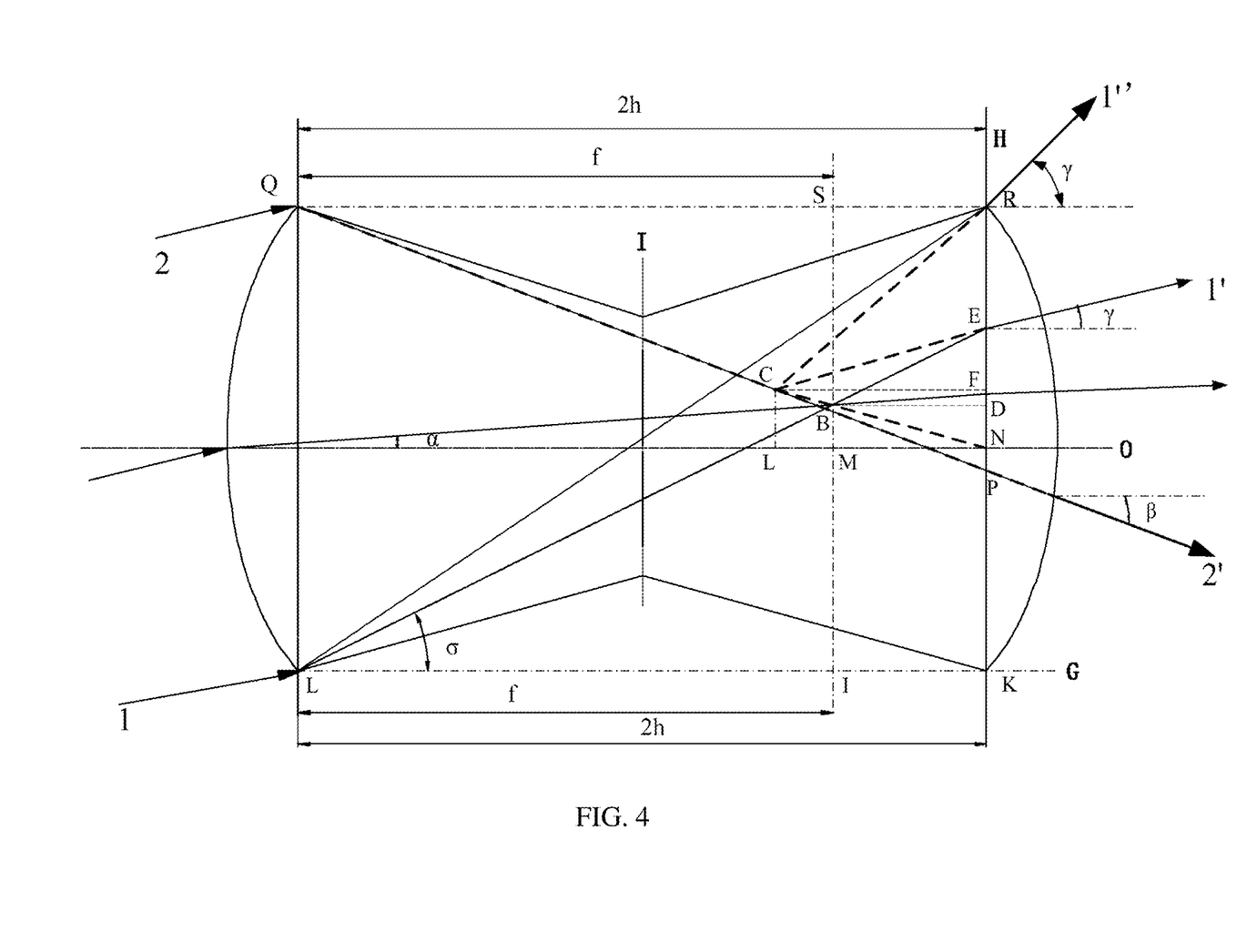
FIG. 4 is a schematic view of a light path of a transparent structure according to an embodiment of the present disclosure.

The light path diagram shown in FIG. 4 can be obtained based on the symmetry principle of ray imaging.

As shown in FIG. 4, when f≤2h and Ray 1 is incident from the lower edge but does not emit from the upper edge, that is, when f≤2h and tan $\alpha$≤d/2h−d/2f, the emergent ray is shown as 1', and at this time, tan $\gamma$=X/Y, where X=EF and Y=CF.

According to an imaging formula of convex lens, 1/u+1/v=1/f, it can be obtained that 1/(−Y)+1/(2h−f)=1/f, and therefore, it can be achieved that Y=(2h−f)*f/(2f−2h).

According to the imaging principle, an intersection of a line connecting the virtual image C with the converging point B of the projected light and an O-axis must be located at a center of the side length of the top surface of the second portion 1011. According to ΔEBD∽ΔELK, it can be achieved that (EO−f*tan $\alpha$/(2h−f)=(EO+d/2)/2h, and according to ΔELK∽ΔBLI, it can be achieved that (EO+d/2)/2h=(f*tan $\alpha$+d/2)/f. Therefore, according to (EO−f*tan $\alpha$)/(2h−f)=(f*tan $\alpha$+d/2)/f, it can be obtained that EO=2h*tan $\alpha$+hd/f−d/2. Similarly, according to ΔCLN ∽ΔBMN, it can be achieved that CO/Y=f*tan $\alpha$/(2h−f), and when substituting Y=(2h−f)*f/(2f−2h) into the above formula, it can be obtained that CO=f²*tan $\alpha$/(2f−2h).

Based on this, $$\tan \gamma = X/Y = (EO-CO)/Y = \frac{\left(2h\tan\alpha + \frac{hd}{f} - \frac{d}{2}\right)(2f-2h) - f^2 \tan\alpha}{(2h-f)f}.$$

When f≤2h and Ray 1 is incident from the lower edge and is emitted from the upper edge, that is, when f≤2h and tan $\alpha$≥d/2h−d/2f, the emergent ray is shown as 1", and at this time, EO=d/2 and $$\tan\gamma = X/Y = [d/2 - f^2 * \tan\alpha/(2f-2h)]/[(2f-f)f/(2f-2h)] = \frac{(f-h)d - f^2\tan\alpha}{(2h-f)f}.$$

When f≤2h and Ray 2 is incident from the upper edge, since positions of points C and B have been determined, the emergent ray 2' of Ray 2 will only emit between the optical axis O and the optical axis G. As shown in FIG. 4, the emergent ray is shown as 2'. At this time, according to ΔPRQ ∽ ΔPFC, it can be achieved that (PN+d/2)/2h=(PN+f*tan α)/(2h−f), and according to ΔPRQ∽ΔBSQ, it can be achieved that (PN+d/2)/2h=(d/2−f*tan α)/f. Therefore, based on (PN+d/2)/2h=(PN+f*tan α)/(2h−f)=(d/2−f*tan α)/f, it can be obtained that PN=hd/f−2h*tan α−d/2.

Since CO=f²*tan α/(2f−2h) and Y=(2h−f)*f/(2f−2h), $$\tan\beta = (PN+CO)/Y = \frac{\left(\frac{hd}{f} - 2h\tan\alpha - \frac{d}{2}\right)(2h-2f) + f^2 \tan\alpha}{(2h-f)f},$$

where CO refers to a vertical distance from point C to the optical axis O, and EO is a vertical distance from point E to the optical axis O.

Figure 5:
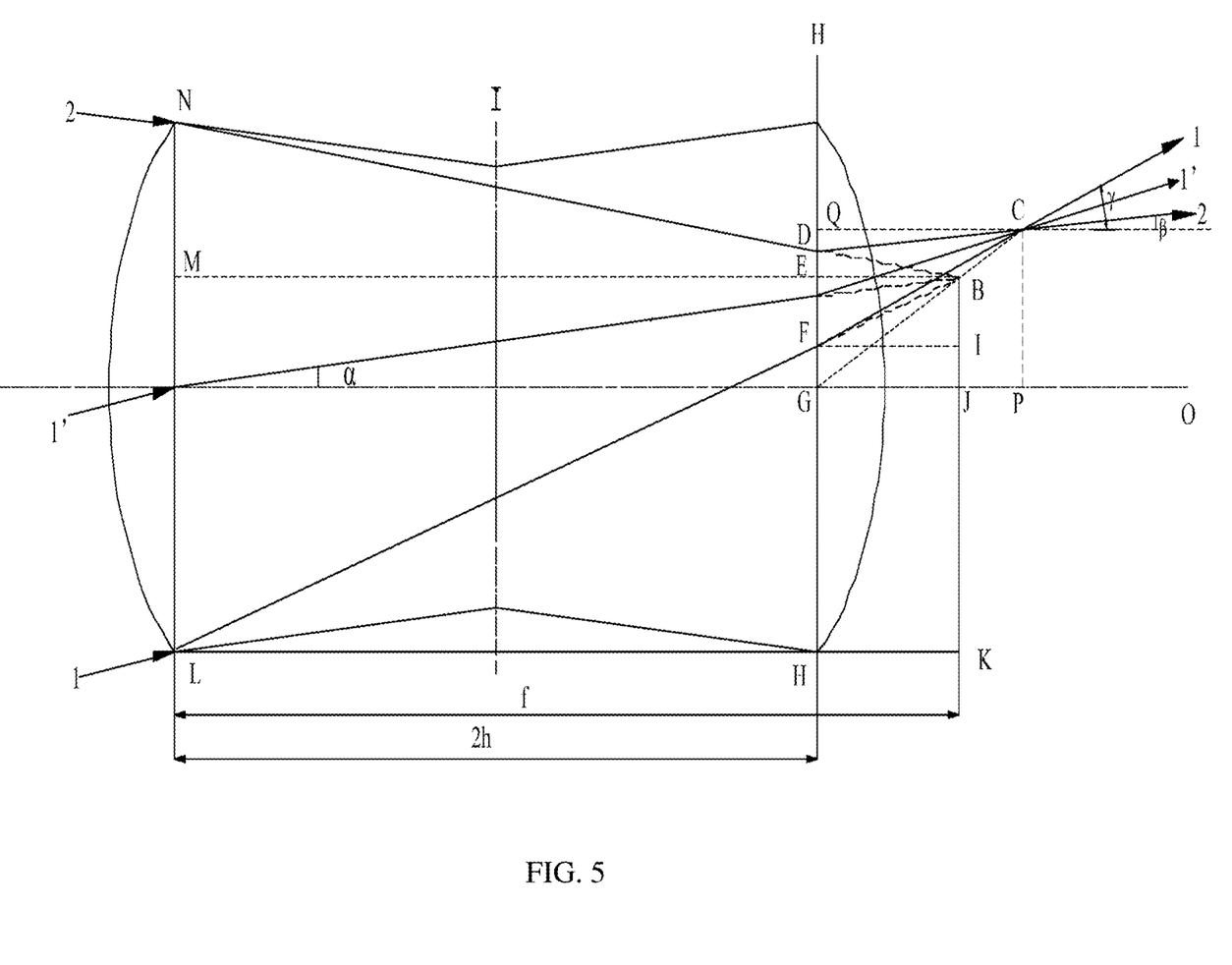
FIG. 5 is a schematic diagram of a light path of another transparent structure according to an embodiment of the present disclosure.

When f>2h, as shown in FIG. 5, let $h_\gamma$=FG and $h_\beta$=DG, according to ΔBFI∽ΔBLK, it can be achieved that (BJ−U)/FI=BK/LK and BJ=f*tan α, that is, (f*tan α−hγ)/(f−2h)=(d/2+f*tan α)/f, and then it can be obtained that $h_\gamma$=(Hd+2fh tan α−df/2)/f²  Formula ①

Moreover, according to ΔBDE∽ΔBNM, it can be obtained that:
DE/BE=NM/BM=(DG−EG)/BE=(NO−BJ)/BM and EG=BJ=f*tan α, that is, ($h_\beta$−f*tan α)/(f−2h)=(d/2−f*tan α)/f, and then it can be obtained that $h_\beta$=d/2−hd/f+2h tan α.  Formula ②

Similarly, according to the imaging formula of convex lens, 1/u+1/v=1/f, it can be obtained that 1/Y+1/(2h−f)=1/f, so it can be achieved that Y=(f−2h)*f/(2f−2h), where Y=CO.  Formula ③

Moreover, according to the fact that Ray GC emitted from point G of the optical axis inevitably passes points B and C and also according to the similar triangle theorem, CP/PG=BJ/JG and CP/Y=f*tan α/(f−2h), it can be achieved that CP=f²*tan α/(2f−2h)=QG.  Formula ④

Tan β=QD/CQ, that is, tan β=(CP−DG)/Y and $h_\beta$=DG, and when substituting formulas ②, ③ and ④, it can be obtained that tan β=((f²*tan α/2f−2h)−(d/2−hd/f+2h tan α))/(f−2h)*f/(2f−2h).

After calculating, it can be obtained that:

$$\tan\beta = \frac{(f-h)(f\tan\alpha - 4hf - df + 2hd - 4hf\tan\alpha)}{f^2(f-2h)}.$$

Similarly,
tan γ=(QG−FG)/CQ=(CP−FG)/CQ and $h_\gamma$=FG, and when substituting formulas ①, ③ and ④, it can be obtained that:

tan γ=((f²*tan α/2f−2h)−(hd+2fh tan α−df/2)/f²)/(f−2h)*f/(2f−2h).

After calculating, it can be obtained that:

$$\tan\gamma = \frac{f\tan\alpha}{f-2h} - \frac{3fhd + 4f^2\tan\alpha - df^2 - 2h^2d - 4fh^2\tan\alpha}{f^3(f-2h)},$$

where the angles α, β, γ are determined by relative relationships among the projection device, the projection screen and the viewer field, d refers to a size of the side length of the top surface of the first portion 1010, and h refers to a distance between the top surface and the bottom surface of the first portion 1010.

It can be known that the emergent angle of the projected light emitted at a certain angle after being refracted by the transparent structure 101 is determined by the focal length f of the top surface of the second portion 1011, the distance h between the top surface and the bottom surface of the first portion 1010, and the side length d of the top surface of the first portion 1010. In addition, the inclination angle θ of the side surface of the transparent structure 101 may be set according to actual needs, in such a manner that the projected light incident at a preset angle is refracted to the reflection layer 103 and the stray light incident at another angle is refracted to the light-absorption structure 102.

Figure 6:
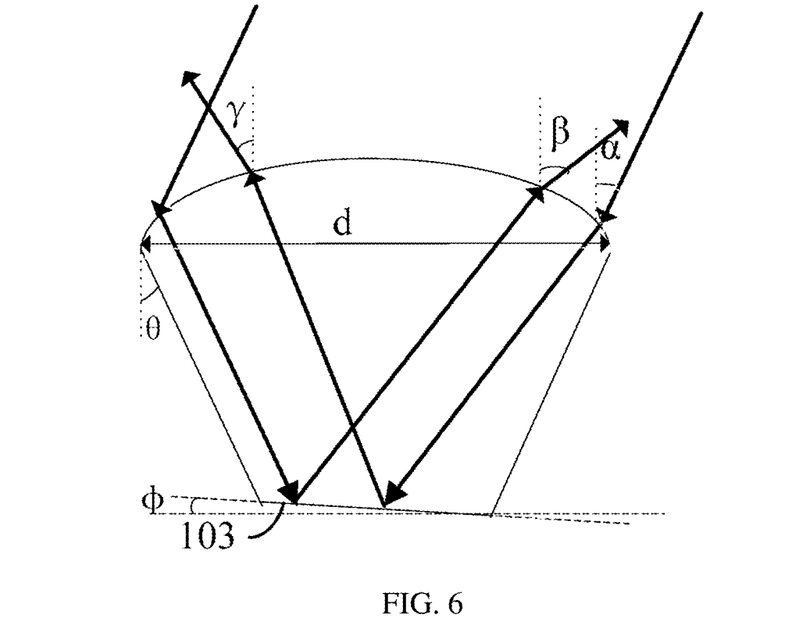
FIG. 6 is a schematic diagram of another transparent structure according to an embodiment of the present disclosure.

In the case where there is substantially no loss of the projected light $\lambda_0$, the angle β generally has a small value. However, in practical applications, the value of the angle β is sometimes required to be large. At this case, the angle γ of the actual emergent ray may be much larger than the actual demand, resulting in a lower projection efficiency of the entire projection system. In view of this, in one embodiment of the present disclosure, a plane of the bottom surface of the first portion 1010 is configured in such a manner that there is a certain angle between this plane and a plane of the top surface of the first portion 1010, and thus there is a certain angle between a plane of the reflection layer 103 on the bottom surface of the first portion 1010 and the plane of the top surface of the first portion 1010. As shown in FIG. 6, the angle between the plane of the reflection layer 103 and the plane of the top surface of the first portion 1010 is Φ, so that the angles β and γ of the emergent light can be controlled by controlling the angle Φ.

Further, a larger degree of freedom to design the emergent angles β and γ can be obtained by controlling the inclination angle θ of the side surface of the transparent structure 101, the distance h between the top surface and the bottom surface of the first portion 1010, the side length d of the top surface of the first portion 1010 and the inclination angle Φ of the reflection layer 103.

It should be further noted that the light-absorption structure 102 in the present embodiment can be made of a color silicon rubber or a transparent material doped with carbon powder. Of course, the present disclosure is not limited thereto, and in other embodiments, the light-absorption structure 102 can also be other light-absorption materials. In addition, the reflection layer 103 in the present embodiment is a metal layer such as aluminum, silver, etc. Of course, the present disclosure is not limited thereto, and in other embodiments, the material of the reflection layer 103 can also be other reflective materials with high reflectivity.

The light-reflecting microstructure provided by the present embodiment includes a transparent structure, a light-absorption structure and a reflection layer. Since the reflection layer can reflect the projected light refracted by the transparent structure and cause the projected light to be emitted at a certain angle after being refracted twice by the transparent structure, the projection screen to which the light-reflecting microstructure is applied can allow the projected light of the image projected onto the screen to be reflected only to the viewer field, resulting in higher brightness of the projection screen and higher efficiency of the projection system. Since the light-absorption structure is capable of absorbing stray light refracted by the transparent structure, the problem that the existing light-reflecting microstructure cannot control the stray light can be solved, thereby improving the contrast of the projection screen.

The embodiment of the present disclosure further provides a projection screen, and this projection screen has a structure substantially the same as that of the existing projection screen. A difference between these two structures lies in that the surface of the projection screen in the present embodiment has a plurality of light-reflecting microstructures, each of which is the light-reflecting microstructure provided in any of the above embodiments and will not be described in detail herein.

Figure 7:
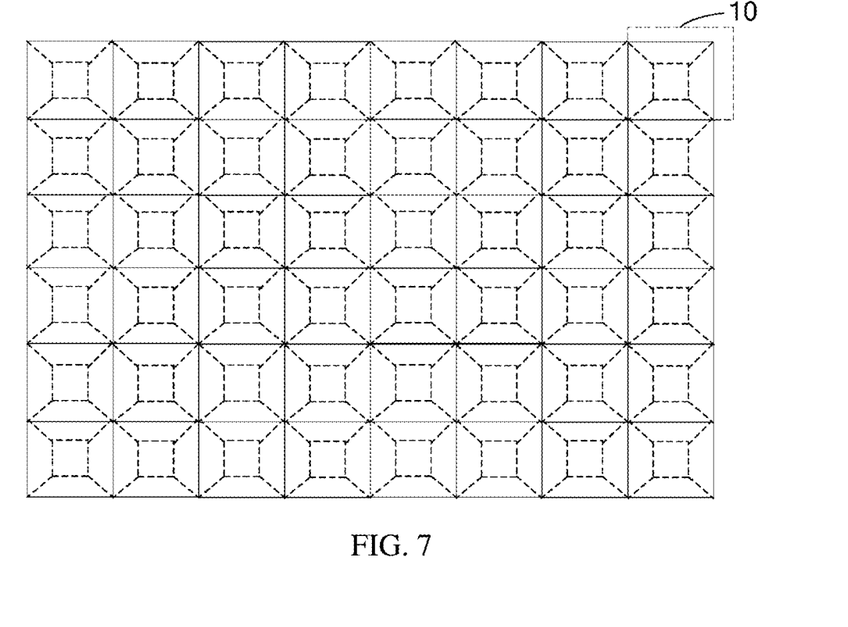
FIG. 7 is a schematic view showing an arrangement of a surface light-reflecting microstructure of a projection screen according to an embodiment of the present disclosure.

The plurality of light-reflecting microstructures may be regularly arranged on a surface of the projection screen, or may be arranged irregularly on the surface of the projection screen. In an example, as shown in FIG. 7, a plurality of light-reflecting microstructures 10 is arranged in a matrix arrangement on the surface of the projection screen.

Parallel projected light is diffusely reflected when being incident on a conventional ordinary screen, and the reflected light is scattered at different angles, while the viewer views the projection image by observing the scattered light on the screen. When the parallel projected light is incident on the projection screen in the present embodiment, it will be converged and reflected by the light-reflecting microstructure 10, that is, the emergent light of the projection screen will be limited to be within a certain angle by the light-reflecting microstructure 10, thereby achieving a gain of the reflected light of the incident light at a certain angle being within a fixed angle range.

Since the inverse extension line of the light emitted from a single light-reflecting microstructure 10 converges at one point, i.e., presenting a virtual image of one point. Therefore, for the viewer, the image seen is no longer a planar reflected light, but a series of luminous points on the projection screen. When the light-reflecting microstructure 10 on the surface of the projection screen is sufficiently small, sizes of the luminous points and distances among the luminous points will also be sufficiently small. When an angle of these sizes present on the projection screen is much smaller than the minimum recognition angle of the human eye, there is no difference between human eye's visual sensory perception to the image presented on the conventional ordinary screen and that to the image presented on the projection screen in the present embodiment.

In the projection screen provided by the present embodiment, the light-reflecting microstructure on the surface of the projection screen includes a transparent structure, a light-absorption structure and a reflection layer. Since the reflection layer can reflect the projected light refracted by the transparent structure and cause the projected light to be emitted at a certain angle after being refracted twice by the transparent structure, the projection screen to which the light-reflecting microstructure is applied can allow the projected light of the image projected onto the screen to be reflected only to the viewer field, resulting in higher projection screen brightness and higher projection system efficiency. Since the light-absorption structure is capable of absorbing stray light refracted by the transparent structure, the problem that the existing light-reflecting microstructure cannot control the stray light can be solved, thereby improving the contrast of the projection screen.

The embodiment of the present disclosure further provides a projection system, which includes a projection device and a projection screen disposed on the light path of the projection device, and the projection screen is the projection screen provided by the above embodiment. The projection system in the present embodiment may be an ultra-short focus projection system or other projection system, but the present disclosure is not limited thereto.

Figure 8:
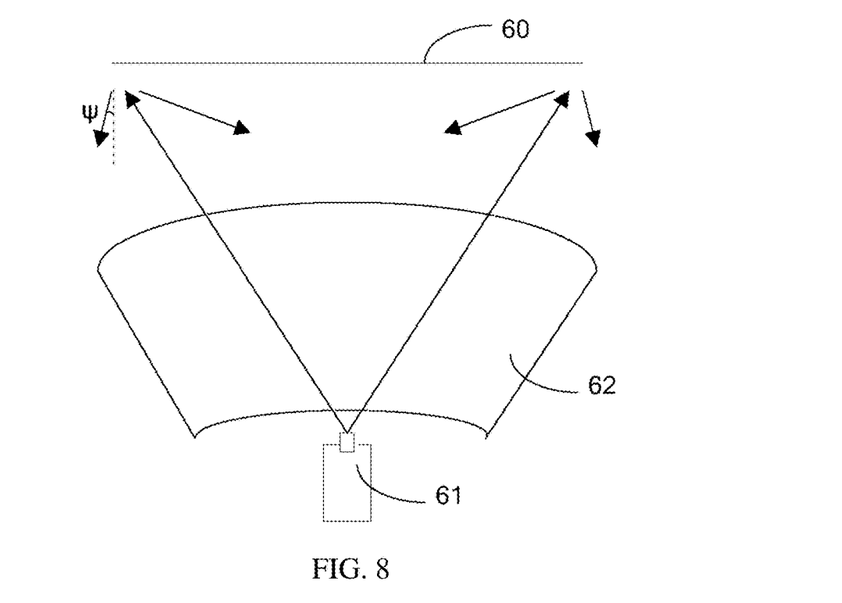
FIG. 8 is a view showing a relative position relationship of a projection screen, a projection device, and a viewer field in a horizontal direction in a projection system according to an embodiment of the present disclosure.
Figure 9:
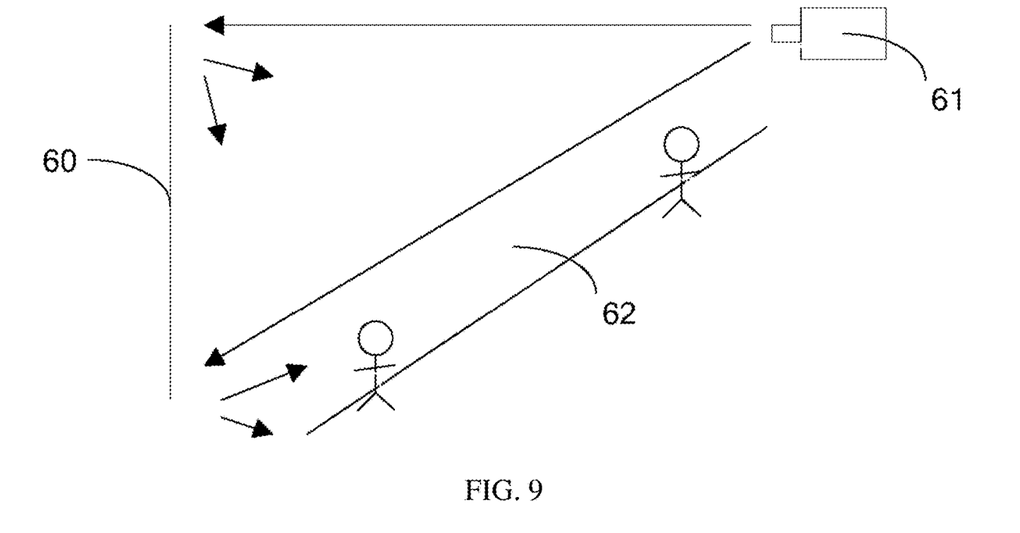
FIG. 9 is a view showing a relative position relationship of a projection screen, a projection device, and a viewer field in a vertical direction in a projection system according to an embodiment of the present disclosure.

In general, relative positional relationships of the projection screen, the projection device and the viewer field are shown in FIGS. 8 and 9. FIG. 8 is a relative positional relationship in the horizontal direction of the projection screen 60, the projection device 61 and the viewer field 62. FIG. 9 is a relative positional relationship in the vertical direction of the projection screen 60, the projection device 61 and the viewer field 62.

As shown in FIG. 8, the projection screen 60 is bilaterally symmetric with respect to the projection device 61, and the viewer field 62 is also bilaterally symmetric with respect to the projection device 61. That is, the projection device 61 is located on a center line of the projection screen 60 and the viewer field 62. Since the maximum emergent angle of the projection screen 60 is an angle $\psi$ from an edge on a side of the projection screen 60 to a first position of a first row on a side of the corresponding viewer field 62, in the present embodiment, a size of the light-reflecting microstructure can be designed in such a manner that the angle $\psi$ is the maximum $\beta$ angle, and the same light-reflecting microstructures are distributed over the surface of the projection screen 60.

Further, in order to increase the range of the emergent angle, the reflection layer of the light-reflecting microstructure may be designed to be inclined. That is, as shown in FIG. 6, the reflection layer is at a certain angle with respect to the projection screen. Moreover, the inclination angle of the reflection layer may vary depending on the position of the projection screen 60. That is, included angles between planes of reflection layers of the light-reflecting microstructures located at different positions of the projection screen 60 and the plane of the projection screen 60 are different. In this way, the emergent angle of each light-reflecting microstructure can be controlled to be as close to a desired angle as possible, which improves the efficiency of the projection system.

In the projection system provided by the embodiment, the light-reflecting microstructure on the surface of the projection screen includes a transparent structure, a light-absorption structure and a reflection layer. Since the reflection layer can reflect the projected light refracted by the transparent structure and cause the projected light to be emitted at a certain angle after being refracted twice by the transparent structure, the projection screen to which the light-reflecting microstructure is applied can allow the projected light of the image projected onto the screen to be reflected only to the viewer field, resulting in higher projection screen brightness and higher projection system efficiency. Since the light-absorption structure is capable of absorbing stray light refracted by the transparent structure, the problem that the existing light-reflecting microstructure cannot control the stray light can be solved, thereby improving the contrast of the projection screen.

The various embodiments in the present specification have been described in a progressive manner, and each embodiment focuses on differences from other embodiments, and the same and similar parts among the various embodiments can be referred to each other. The above descriptions of the disclosed embodiments enable those skilled in the art to implement or use the present disclosure. Various modifications made to these embodiments will be apparent to those skilled in the art, and the general principles defined herein may be implemented in other embodiments without departing from the spirit or scope of the present disclosure. Therefore, the present disclosure is not limited to the embodiments shown herein, but conforms to the widest scope consistent with the principle and novelty characteristics disclosed herein.

What is claimed is:

1. A light-reflecting microstructure, comprising:
a transparent structure, the transparent structure comprising a light incident surface, a light-reflecting surface, and a light-absorption surface connecting the light incident surface and the light-reflecting surface;
a light-absorption structure located on the light-absorption surface; and
a reflection layer located on the light-reflecting surface,
wherein the transparent structure is configured to refract projected light incident on the light incident surface at a preset angle to the reflection layer, and refract stray light incident on the light incident surface at any angle other than the preset angle to the light-absorption structure,
the reflection layer is configured to reflect the projected light in such a manner that the projected light is emitted at a certain angle from the light incident surface after being refracted twice by the transparent structure, and
the light-absorption structure is configured to absorb the stray light,
wherein the transparent structure comprises a first portion and a second portion located at a top of the first portion,
the first portion is a structure having a cross section being an inverted trapezoid, the second portion is a structure having a bottom surface being a planar surface and a top surface being a curved surface, the top surface of the second portion is the light incident surface of the transparent structure, a bottom surface of the first portion is the light-reflecting surface of the transparent structure, and a side surface of the first portion is the light-absorption surface of the transparent structure.

2. The light-reflecting microstructure according to claim 1, wherein the curved surface is a cylindrical, arced or spherical curved surface.

3. The light-reflecting microstructure according to claim 1, wherein an emergent angle of the projected light emitted from the light incident surface at a certain angle after being refracted by the transparent structure is determined by a focal length of the top surface of the second portion, a distance between a top surface of the first portion and the bottom surface of the first portion, and a side length of the top surface of the first portion.

4. The light-reflecting microstructure according to claim 3, wherein:
when f≤2h and tan α≤d/2h-d/2f, $$\tan\gamma = \frac{\left(2h\tan\alpha + \frac{hd}{f} - \frac{d}{2}\right)(2f-2h) - f^2\tan\alpha}{(2h-f)f};$$

when f≤2h and tan α≥d/2h-d/2f, $$\tan\gamma = \frac{(f-h)d - f^2\tan\alpha}{(2h-f)f};$$

when f≤2h, $$\tan\beta = \frac{\left(\frac{hd}{f} - 2h\tan\alpha - \frac{d}{2}\right)(2h-2f) + f^2\tan\alpha}{(2h-f)f};$$

when f>2h, $$\tan\gamma = \frac{f\tan\alpha}{f-2h} - \frac{3fhd + 4f^2\tan\alpha - df^2 - 2h^2d - 4fh^2\tan\alpha}{f^3(f-2h)};$$

and
when f>2h, tan $$\tan\beta = \frac{(f-h)(f\tan\alpha - 4hf - df + 2hd - 4hf\tan\alpha)}{f^2(f-2h)},$$

wherein α is an incident angle of the projected light entering into the transparent structure, β is a first maximum emergent angle of the projected light emitted from the transparent structure, γ is a second maximum emergent angle of the projected light emitted from the transparent structure, the first maximum emergent angle and the second maximum emergent angle are maximum emergent angles respectively located at two sides of a normal of the light-reflecting microstructure, d is the side length of the top surface of the first portion, h is the distance between the top surface of the first portion and the bottom surface of the first portion, and f is the focal length of the top surface of the second portion.

5. The light-reflecting microstructure according to claim 1, wherein a plane of the reflection layer is parallel to or angled with respect to a plane of the top surface of the first portion.

6. The light-reflecting microstructure according to claim 1, wherein the light-absorption structure is made of a color silicone rubber or a transparent material doped with carbon powder.

7. The light-reflecting microstructure according to claim 1, wherein the reflection layer is a metal layer.

8. A projection screen, comprising a surface having a plurality of light-reflecting microstructures, each of the plurality of light-reflecting microstructures comprising:
a transparent structure, the transparent structure comprising a light incident surface, a light-reflecting surface, and a light-absorption surface connecting the light incident surface and the light-reflecting surface;
a light-absorption structure located on the light-absorption surface; and
a reflection layer located on the light-reflecting surface,
wherein the transparent structure is configured to refract projected light incident on the light incident surface at a preset angle to the reflection layer, and refract stray light incident on the light incident surface at any angle other than the preset angle to the light-absorption structure,
the reflection layer is configured to reflect the projected light in such a manner that the projected light is emitted at a certain angle from the light incident surface after being refracted twice by the transparent structure, and
the light-absorption structure is configured to absorb the stray light, wherein the transparent structure comprises a first portion and a second portion located at a top of the first portion, the first portion is a structure having a cross section being an inverted trapezoid, the second portion is a structure having a bottom surface being a planar surface and a top surface being a curved surface, the top surface of the second portion is the light incident surface of the transparent structure, a bottom surface of the first portion is the light-reflecting surface of the transparent structure, and a side surface of the first portion is the light-absorption surface of the transparent structure.

9. The projection screen according to claim 8, wherein the curved surface is a cylindrical, arced or spherical curved surface.

10. The projection screen according to claim 8, wherein an emergent angle of the projected light emitted from the light incident surface at a certain angle after being refracted by the transparent structure is determined by a focal length of the top surface of the second portion, a distance between a top surface of the first portion and the bottom surface of the first portion, and a side length of the top surface of the first portion.

11. The projection screen according to claim 10, wherein:
when f≤2h and tan α≤d/2h−d/2f, $$\tan \gamma = \frac{\left(2h \tan \alpha + \frac{hd}{f} - \frac{d}{2}\right)(2f - 2h) - f^2 \tan \alpha}{(2h - f)f};$$

when f≤2h and tan α≥d/2h−d/2f, $$\tan \gamma = \frac{(f - h)d - f^2 \tan \alpha}{(2h - f)f};$$

when f≤2h, $$\tan \beta = \frac{\left(\frac{hd}{f} - 2h \tan \alpha - \frac{d}{2}\right)(2h - 2f) + f^2 \tan \alpha}{(2h - f)f};$$

when f>2h, $$\tan \gamma = \frac{f \tan \alpha}{f - 2h} - \frac{3fhd + 4f^2 \tan \alpha - df^2 - 2h^2 d - 4fh^2 \tan \alpha}{f^3(f - 2h)};$$

and
when f>2h, $$\tan \beta = \frac{(f - h)(f \tan \alpha - 4hf - df + 2hd - 4hf \tan \alpha)}{f^2(f - 2h)},$$

wherein α is an incident angle of the projected light entering into the transparent structure, β is a first maximum emergent angle of the projected light emitted from the transparent structure, γ is a second maximum emergent angle of the projected light emitted from the transparent structure, the first maximum emergent angle and the second maximum emergent angle are maximum emergent angles respectively located at two sides of a normal of the light-reflecting microstructure, d is the side length of the top surface of the first portion, h is the distance between the top surface of the first portion and the bottom surface of the first portion, and f is the focal length of the top surface of the second portion.

12. The projection screen according to claim 8, wherein the plurality of light-reflecting microstructures is arranged in a matrix arrangement on the surface of the projection screen.

13. A projection system, comprising a projection device and a projection screen disposed on a projection light path of the projection device, the projection screen comprising a surface having a plurality of light-reflecting microstructures, each of the plurality of light-reflecting microstructures comprising:
a transparent structure, the transparent structure comprising a light incident surface, a light-reflecting surface, and a light-absorption surface connecting the light incident surface and the light-reflecting surface;
a light-absorption structure located on the light-absorption surface; and
a reflection layer located on the light-reflecting surface,
wherein the transparent structure is configured to refract projected light incident on the light incident surface at a preset angle to the reflection layer, and refract stray light incident on the light incident surface at any angle other than the preset angle to the light-absorption structure,
the reflection layer is configured to reflect the projected light in such a manner that the projected light is emitted at a certain angle from the light incident surface after being refracted twice by the transparent structure, and
the light-absorption structure is configured to absorb the stray light,
wherein the transparent structure comprises a first portion and a second portion located at a top of the first portion, the first portion is a structure having a cross section being an inverted trapezoid, the second portion is a structure having a bottom surface being a planar surface and a top surface being a curved surface, the top surface of the second portion is the light incident surface of the transparent structure, a bottom surface of the first portion is the light-reflecting surface of the transparent structure, and a side surface of the first portion is the light-absorption surface of the transparent structure.

14. The projection system according to claim 13, wherein the curved surface is a cylindrical, arced or spherical curved surface.

15. The projection system according to claim 13, wherein an emergent angle of the projected light emitted from the light incident surface at a certain angle after being refracted by the transparent structure is determined by a focal length of the top surface of the second portion, a distance between a top surface of the first portion and the bottom surface of the first portion, and a side length of the top surface of the first portion.

16. The projection system according to claim 15, wherein:
when f≤2h and tan α≤d/2h−d/2f, $$\tan \gamma = \frac{\left(2h \tan \alpha + \frac{hd}{f} - \frac{d}{2}\right)(2f - 2h) - f^2 \tan \alpha}{(2h - f)f};$$

when f≤2h and tan α≥d/2h-d/2f, a;
when f≤2h, $$\tan\beta = \frac{\left(\frac{hd}{f} - 2h \tan \alpha - \frac{d}{2}\right)(2h - 2f) + f^2 \tan \alpha}{(2h - f)f};$$

when f>2h, $$\tan \gamma = \frac{f \tan \alpha}{f - 2h} - \frac{3fhd + 4f^2 \tan \alpha - df^2 - 2h^2 d - 4fh^2 \tan \alpha}{f^3(f - 2h)};$$

and
when f>2h, $$\tan \beta = \frac{(f - h)(f \tan \alpha - 4hf - df + 2hd - 4hf \tan \alpha)}{f^2(f - 2h)},$$

wherein α is an incident angle of the projected light entering into the transparent structure, β is a first maximum emergent angle of the projected light emitted from the transparent structure, γ is a second maximum emergent angle of the projected light emitted from the transparent structure, the first maximum emergent angle and the second maximum emergent angle are maximum emergent angles respectively located at two sides of a normal of the light-reflecting microstructure, d is the side length of the top surface of the first portion, h is the distance between the top surface of the first portion and the bottom surface of the first portion, and f is the focal length of the top surface of the second portion.

17. The projection system according to claim 13, wherein angles between planes of reflection layers of the plurality of light-reflecting microstructures located at different positions of the projection screen and a plane of the projection screen are different.

* * * * *

UNITED STATES PATENT AND TRADEMARK OFFICE
CERTIFICATE OF CORRECTION

PATENT NO. : 10,656,513 B2
APPLICATION NO. : 16/319260
DATED : May 19, 2020
INVENTOR(S) : Yuxuan Zhou Page 1 of 1

It is certified that error appears in the above-identified patent and that said Letters Patent is hereby corrected as shown below:

In the Specification

In Column 5, Line 41, delete "do" and insert --$d_0$--.

In Column 6, Line 39, delete "(EO-f*tan α/(2h-f)" and insert --(EO-f*tan α)/(2h-f)--.

Signed and Sealed this
Thirteenth Day of October, 2020

Andrei Iancu
*Director of the United States Patent and Trademark Office*